United States Patent
Reynolds et al.

(10) Patent No.: US 12,360,514 B2
(45) Date of Patent: Jul. 15, 2025

(54) TAG DRIVEN DATA PIPELINES IN AN INDUSTRIAL AUTOMATION ENVIRONMENT

(71) Applicant: Rockwell Automation Technologies, Inc., Mayfield Heights, OH (US)

(72) Inventors: Jordan C. Reynolds, Austin, TX (US); John J. Hagerbaumer, Mequon, WI (US); Troy W. Mahr, Pleasant Prairie, WI (US); Thomas K. Jacobsen, Wake Forest, NC (US); Giancarlo Scaturchio, Pisa (IT)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 680 days.

(21) Appl. No.: 17/698,612

(22) Filed: Mar. 18, 2022

(65) Prior Publication Data
US 2023/0297080 A1 Sep. 21, 2023

(51) Int. Cl.
G05B 19/418 (2006.01)
(52) U.S. Cl.
CPC .......... G05B 19/41835 (2013.01); *G05B 2219/31368* (2013.01)
(58) Field of Classification Search
CPC .... G05B 19/41835; G05B 2219/31368; G05B 2219/15131; G05B 2219/33081; G05B 19/056
See application file for complete search history.

(56) References Cited

U.S. PATENT DOCUMENTS

2002/0199008 A1* 12/2002 Pecen ............... H04W 28/12
370/349
2011/0071963 A1* 3/2011 Piovesan ............ G06Q 10/00
706/11

(Continued)

FOREIGN PATENT DOCUMENTS

WO  WO-2020198249 A1 * 10/2020 ............. G05B 17/02

OTHER PUBLICATIONS

Extended European Search Report for EP Application No. 23160432.3, mailed Jul. 17, 2023; 12 pages.

*Primary Examiner* — Kamini S Shah
*Assistant Examiner* — Mohammed Shafayet

(57) ABSTRACT

Various embodiments of the present technology generally relate to industrial automation environments. More specifically, embodiments include systems and methods to surface data pipelines in an industrial automation environment. In some examples, a design component generates a control program configured for implementation by a programmable logic controller to control an industrial process. The design component adds program tags to the control program and implements the control program through the programmable logic controller. The design component establishes data pipelines that correspond to the program tags in the control program between data sources associated with the program tags and a machine learning system that consumes process data generated by the data sources. A pipeline management component generates a pipeline suggestion that indicates individual ones of the data pipelines and their corresponding program tags. The pipeline management component surfaces the pipeline suggestion via a software user interface.

20 Claims, 7 Drawing Sheets

(56) References Cited

U.S. PATENT DOCUMENTS

| | | | |
|---|---|---|---|
| 2016/0098037 A1* | 4/2016 | Zornio | H04L 43/045 |
| | | | 700/20 |
| 2020/0068759 A1* | 2/2020 | Cvijetinovic | H05K 13/0895 |
| 2020/0265329 A1* | 8/2020 | Thomsen | G06N 20/10 |
| 2022/0171891 A1* | 6/2022 | Sinha | G05B 23/0281 |

* cited by examiner

TAG DRIVEN DATA PIPELINES IN AN INDUSTRIAL AUTOMATION ENVIRONMENT

BACKGROUND

Industrial manufacturing environments generate huge quantities of data at very fast speeds making the extraction of enterprise-level insights challenging. In industrial automation environments, control systems are used to drive various operations along an industrial line. Control programs are developed by programmers and comprise a set of program tags to carry out an industrial operation. The program tags comprise chunks of the control code and correspond to industrial assets, devices, and sensors. Control code is used by control systems like Programmable Logic Controllers (PLCs) to drive the industrial assets, devices, and sensors in an industrial process. Industrial manufacturing environments typically comprise a large number of assets, devices, and sensors and the number of tags available for use in the control programs is correspondingly large. Data generated by the industrial assets, devices, and sensors is analyzed by data processing systems to identify improvements for the industrial manufacturing environments. Unfortunately, the large number of available tags and the corresponding large amount of data make data analysis difficult. Moreover, industrial automation environments do not effectively or efficiently track associations between the available tags, the process data, and the data processing systems.

Machine learning algorithms are designed to recognize patterns and automatically improve through training and the use of data. Examples of machine learning algorithms include artificial neural networks, nearest neighbor methods, gradient-boosted trees, ensemble random forests, support vector machines, naïve Bayes methods, and linear regressions. A machine learning algorithm comprises an input layer and an output layer, wherein complex analyzation takes places between the two layers. Various training methods are used to train machine learning algorithms wherein an algorithm is continually updated and optimized until a satisfactory model is achieved. One advantage of machine learning algorithms is their ability to learn by example, rather than needing to be manually programmed to perform a task, especially when the tasks would require a near-impossible amount of programming to perform the operations in which they are used.

OVERVIEW

This Overview is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Various embodiments of the present technology generally relate to solutions for integrating machine learning models into industrial automation environments. Some embodiments comprise a system to surface data pipelines in an industrial automation environment. In some examples, a design component generates a control program configured for implementation by a programmable logic controller to control an industrial process. The design component adds program tags to the control program and implements the control program through the programmable logic controller. The design component establishes data pipelines that correspond to the program tags in the control program between data sources associated with the program tags and a machine learning system that consumes process data generated by the data sources. A pipeline management component generates a pipeline suggestion that indicates individual ones of the data pipelines and their corresponding program tags. The pipeline management component surfaces the pipeline suggestion via a software user interface.

In some embodiments, an apparatus comprises computer readable storage media and processors operatively coupled with the computer readable storage media. The storage media store program instructions to surface data pipelines in an industrial automation environment. When the program instructions are executed by the processors, the computing apparatus generates a control program configured for implementation by a programmable logic controller to control an industrial process. The computing apparatus adds program tags to the control program and implements the control program through the programmable logic controller. The computing apparatus establishes data pipelines that correspond to the program tags in the control program between data sources associated with the program tags and a machine learning system that consumes process data generated by the data sources. A computing apparatus generates a pipeline suggestion that indicates individual ones of the data pipelines and their corresponding program tags. The computing apparatus surfaces the pipeline suggestion via a software user interface.

Some embodiments comprise a method to surface data pipelines in an industrial automation environment. The method entails generating a control program configured for implementation by a programmable logic controller to control an industrial process. The method continues by adding program tags to the control program and implementing the control program through the programmable logic controller. The method continues by establishing data pipelines that correspond to the program tags in the control program between data sources associated with the program tags and a machine learning system that consumes process data generated by the data sources. The method continues by generating a pipeline suggestion that indicates individual ones of the data pipelines and their corresponding program tags. The method continues by surfacing the pipeline suggestion via a software user interface.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
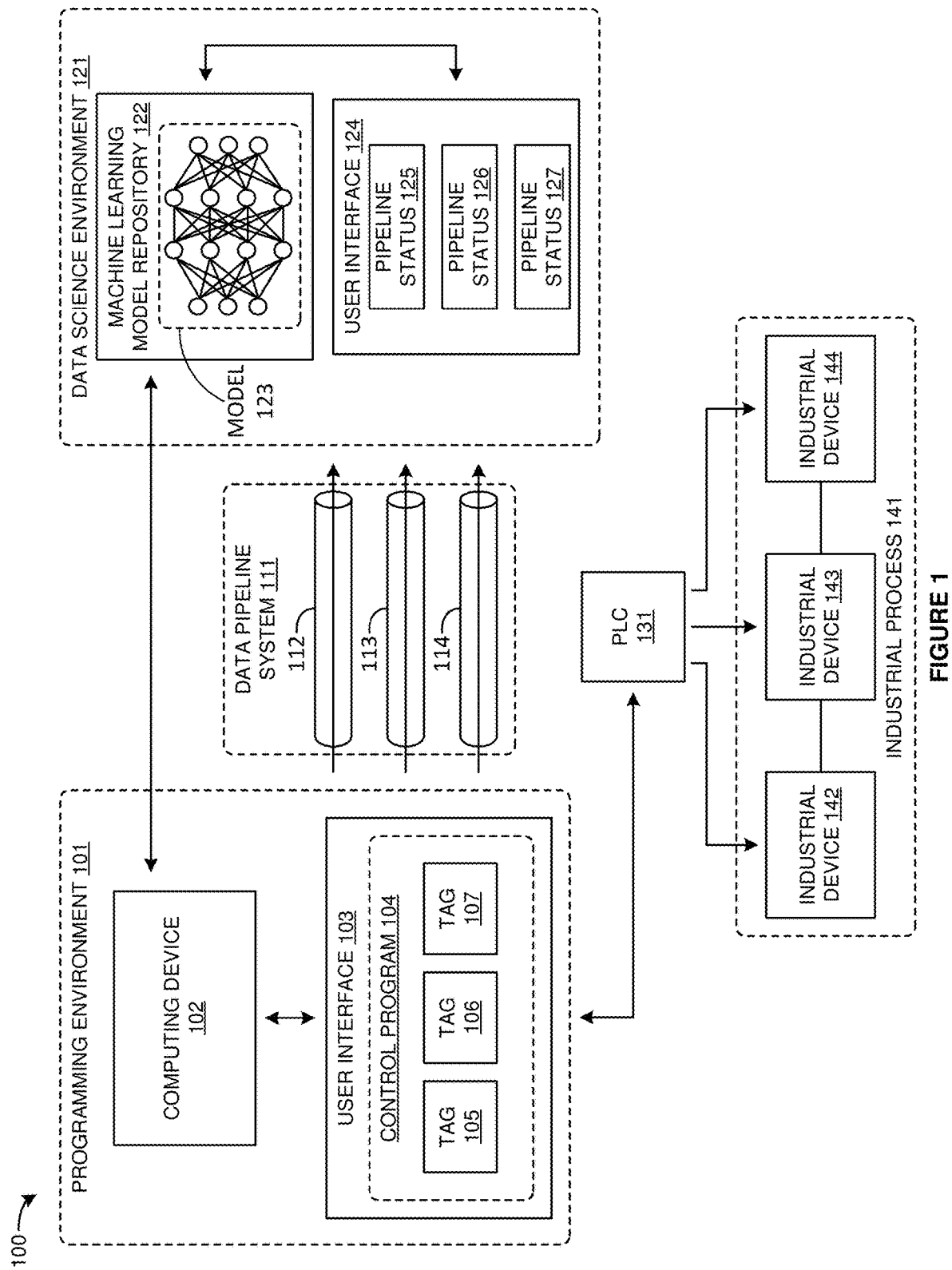
FIG. 1 illustrates an exemplary industrial automation environment to surface data pipelines in the industrial automation environment.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology generally relate to solutions for integrating machine learning models into industrial automation environments. More specifically, embodiments of the present technology include systems and methods for instantiating and surfacing data pipelines between design applications configured to generate industrial control programs and machine learning models configured to ingest data relevant to the control programs. Generally, industrial control programs provide instructions for controlling and performing certain operations within an industrial environment via controllers like Programmable Logic Controllers (PLCs). The control programs comprise control code in the form of program tags, functional blocks, and/or some other type of control code. The controllers receive the control programs and execute their constituent control code to control downstream devices, machinery, and automated processes.

The present technology serves to enhance industrial control by enabling the instantiation of data pipelines that correspond to program tags in a control program for more advanced control. Industrial automation environments often fail to effectively establish relevant and timely communications between programming environments and data science environments. Programming environments allow a programmer to "drag and drop" program tags that represent industrial assets into a control program. The program tags correspond to machinery in an automated process, machine settings, machine operations, and the like. The programmer can connect the tags to one another to construct a control program designed to implement an automated industrial process. Data science environments allow a programmer to view and analyze historical process data generated by the industrial automated process implemented by the control program. In an implementation of the present technology, data pipelines are established between design applications configured to generate control programs in the programming environment and machine learning models in the data science environment in response to the addition of program tags to the control programs. Information related to the program tags, their corresponding data pipelines, and their corresponding machine learning models is surfaced in the data science environments.

In some embodiments, data pipelines may be established between design applications in the programming environment and machine learning models in the data science environment. Data pipelines comprise a series of data processing elements that connect a data source to a data destination. Data pipelines may ingest raw or unprocessed data from the data sources. The raw data may pass through the series of data processing elements and undergo various data processing steps. For example, on of the data processing elements my comprise a feature extraction module to configured unprocessed data into a suitable format for machine learning model ingestion. The data pipelines may then emit the now processed data for consumption by the data source.

In some embodiments, machine learning models may be connected with other elements within the industrial automation environment like design application servers in the programming environment. A machine learning model may consume data relevant to operations within an industrial automation environment. The model may generate machine learning outputs that comprise control optimizations for the industrial automation environment. For example, an input to the machine learning model may be data from a temperature sensor that is monitoring the temperature delta of a heat exchanger process. In response to input from the temperature sensor, the model may process the input using machine learning algorithms to generate a machine learning output. The output from the model may control parameters to optimize the operation of temperature sensor or some other element in the heat exchanger process.

In some embodiments, a machine learning model comprises one or more machine learning algorithms that are trained based on historical data and/or other types of training data. A machine learning model may employ one or more machine learning algorithms through which data can be analyzed to identify patterns, make decisions, make predictions, or similarly produce output that can inform control code and/or parameters. Examples of machine learning algorithms that may be employed solely or in conjunction with one another include artificial neural networks, nearest neighbor methods, ensemble random forests, support vector machines, naïve Bayes methods, linear regressions, or similar machine learning techniques or combinations thereof capable of predicting output based on input data. Determining which machine learning methods to use may depend on the specific purpose or functions required in a particular industrial setting. Machine learning models may be deployed on premises in an industrial automation environment or off-site. For example, the machine learning model may be implemented in a data science environment and have a live connection using a data pipeline with a programming environment configured to generate control programs.

In some embodiments, faceplates, displays, Human Machine Interfaces (HMIs), and the like are contemplated herein to provide intuitive representations and interfaces to models in the programming environment and in the data science environment. A faceplate may comprise basic controls and/or visuals relevant to the control program that the model is assisting within the control environment. For example, an operator can view or use a kiosk within the industrial automation environment to perform a task such as identifying active or inactive data pipelines with a machine learning model, determining data flow types for the data pipelines, determining tag association with the data pipelines, and/or other types of interaction with the machine learning model.

Now referring to the Figures, FIG. 1 illustrates industrial automation environment 100 to surface data pipelines for an automated industrial process. Industrial automation environment 100 performs services like factory automation, factory control, machine control, smart manufacturing, machine communication and organization, and the like. Industrial automation environment 100 comprises programming environment 101, data pipeline system 111, data science environment 121, Programmable Logic Controller (PLC) 131, and industrial process 141. Programming environment 101 comprises computing device 102, user interface 103, and control program 104. Control program 104 comprises program tags 105-107. Data pipeline system 111 comprises data pipelines 112-114. Data science environment 121 comprises machine learning model repository 122, machine learning model 123, and user interface 124. User interface 124 comprise pipeline status modules 125-127. Industrial process 141 comprises industrial devices 142-144. In other examples, industrial automation environment 100 may include fewer or additional components than those illustrated in FIG. 1. Likewise, the illustrated components of industrial automation environment 100 may include fewer or additional components, assets, or connections than shown. Each of computing devices 102, user interface 103, machine learning model repository 122, and/or user interface 124, may be representative of a single computing apparatus or multiple computing apparatuses.

Computing device 102 comprises one or more computing apparatuses configured to host an application(s) that is configured to generate control program 104, to interface with data science environment 121, to manage to pipeline system 111, and/or perform some other function. It should be appreciated that the specific number of applications/modules hosted by computing device 102 is not limited. Exemplary applications hosted by computing device 102 include Studio 5000® and the like. Control program 104 is representative of machine instructions that direct the operations of industrial process 141. Control program 104 may comprise a functional block diagram, a ladder logic diagram, or some other type of machine instructions executable by PLC 131. Program tags 105-107 comprise control code chucks that correspond to various components, variables, and processes of industrial process 141. For example, program tag 105 may comprise control code dictates the operation of a pressure sensor in industrial device 142. Control program 104 may comprise additional program tags (not shown for clarity) that correspond to additional program instructions. Computing device 102 may add program tags to control program 104 in response to user input received via user interface 103. Computing device 102 may transfer control program 104 to PLC 131. PLC 131 may execute tags 105-107 of control program 104 to control the operations of machines 142-144.

Computing device 102 is coupled to user interface 103. User interface 103 comprises a display, keyboard, touchscreen, tablet, and the like. User interface 103 displays a Guided User Interface (GUI) that allows a user to interact with the application(s) hosted by computing device 102, including the design application configured to generate control program 104. A user may interact with the GUI via user interface 103 to generate control program 104. For example, a user may select, drag-and-drop, or perform some type of action via user interface 103 to construct control program 104.

Programming environment 101 is coupled to data science environment 121. Over data pipeline system 111. A data pipeline comprises a series of data processing elements that receive a data input, perform a series of data processing operations on the data input to generate a data output, and emit the data output. In some examples, data pipelines 112-114 may transfer process data generated by industrial devices 142-144 from programming environment 101 to data science environment 121. Computing device 102 may establish data pipelines 112-114 with machine learning model repository 122 to transfer the process data generated by industrial devices 142-144. In some examples, data pipelines 112-114 may correspond to tags 105-107 of control program 104 and computing device 102 may establish 112-114 when program tags 105-107 are added to control program 104.

Machine learning model repository 122 hosts machine learning model 123. Machine learning model 123 is representative of any machine learning model implemented within industrial automation environment 100 as described herein. Machine learning model 123 is configured to determine correlations between different program tags that represent the various processes and variables industrial process 141. Machine learning model 123 hosted by repository 122 may be trained using input data generated from by computing device 102, industrial devices 142-144, external sources, and/or some other type of training source. Machine learning model repository 122 may receive process data generated in industrial process 141 over data pipeline system 111. Machine learning model 123 may ingest the process data and a generate a machine learning output that comprises optimizations to industrial process 141 to improve the control over process 141. In some examples, machine learning model repository 122 transfers the machine learning output generated by model 123 to computing device 102 for display on user interface 103. Machine learning model repository 122 may also transfer the machine learning outputs and data pipeline information user interface 124 for presentation to a user. For example, repository 122 may transfer an indication to user interface 124 that indicates the status of pipeline 112, the program tag associated with pipeline 112, and/or other relevant pipeline information.

Machine learning model repository 122 is coupled to user interface 124. User interface 124 comprises a display, keyboard, touchscreen, tablet, and the like. User interface 103 displays a GUI that allows a user to interact with the application(s) hosted by machine learning repository 122 and view the status of data pipeline system 111. User interface 124 comprises pipeline status modules 125-127. Pipeline status modules 125-127 may comprise visual representations of the status of data pipelines 112-114. Modules 125-127 may display where a pipeline is active, the machine learning model associated with the pipeline, the program tag associated with the pipeline, the type of process data it is transferring, and/or other types of data pipeline status indicators.

Programming environment 101 is functionally coupled to PLC 131 that implements control program 104 to control industrial process 141. For example, PLC 131 may receive and execute control program 104 from computing device 102 and transfer the executed program to industrial devices 142-144 to implement industrial process 141. Industrial process 141 is representative of a manufacturing, chemical production, food processing, or any other type of industrial process. Industrial devices 142-144 are representative of machines configured to carry out industrial process 141. Industrial devices 142-144 may comprise of pumps, motors, heat exchanges, reactors, food processing systems, or any other type of industrial device. Typically, the type of machines represented by industrial devices 142-144 depend in part on the type of process that industrial process 141 is representative of. Industrial devices 142-144 receive machine instructions generated in programming environment 101 and operate in response to the instructions to implement industrial process 141.

Programming environment 101, data pipeline system 111, data science environment 121, PLC 131, and industrial process 141 communicate over various communication links using communication technologies like industrial ethernet, Institute of Electrical and Electronic Engineers (IEEE) 802.3 (ENET), IEEE 802.11 (WIFI), Bluetooth, Time Division Multiplex (TDM), Data Over Cable System Interface Specification (DOCSIS), Internet Protocol (IP), General Packet Radio Service Transfer Protocol (GTP), and/or some other type of wireline and/or wireless networking protocol. The communication links comprise metallic links, glass fibers, radio channels, or some other communication media. The links use ENET, WIFI, virtual switching, inter-processor communication, bus interfaces, and/or some other data communication protocols.

Computing device 102, user interface 103, PLC 131, machine learning model repository 122, user interface 124, and industrial devices 142-144 may comprise microprocessors, software, memories, transceivers, bus circuitry, and the like. The microprocessors comprise Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of industrial automation environment 100 as described herein.

Figure 2:
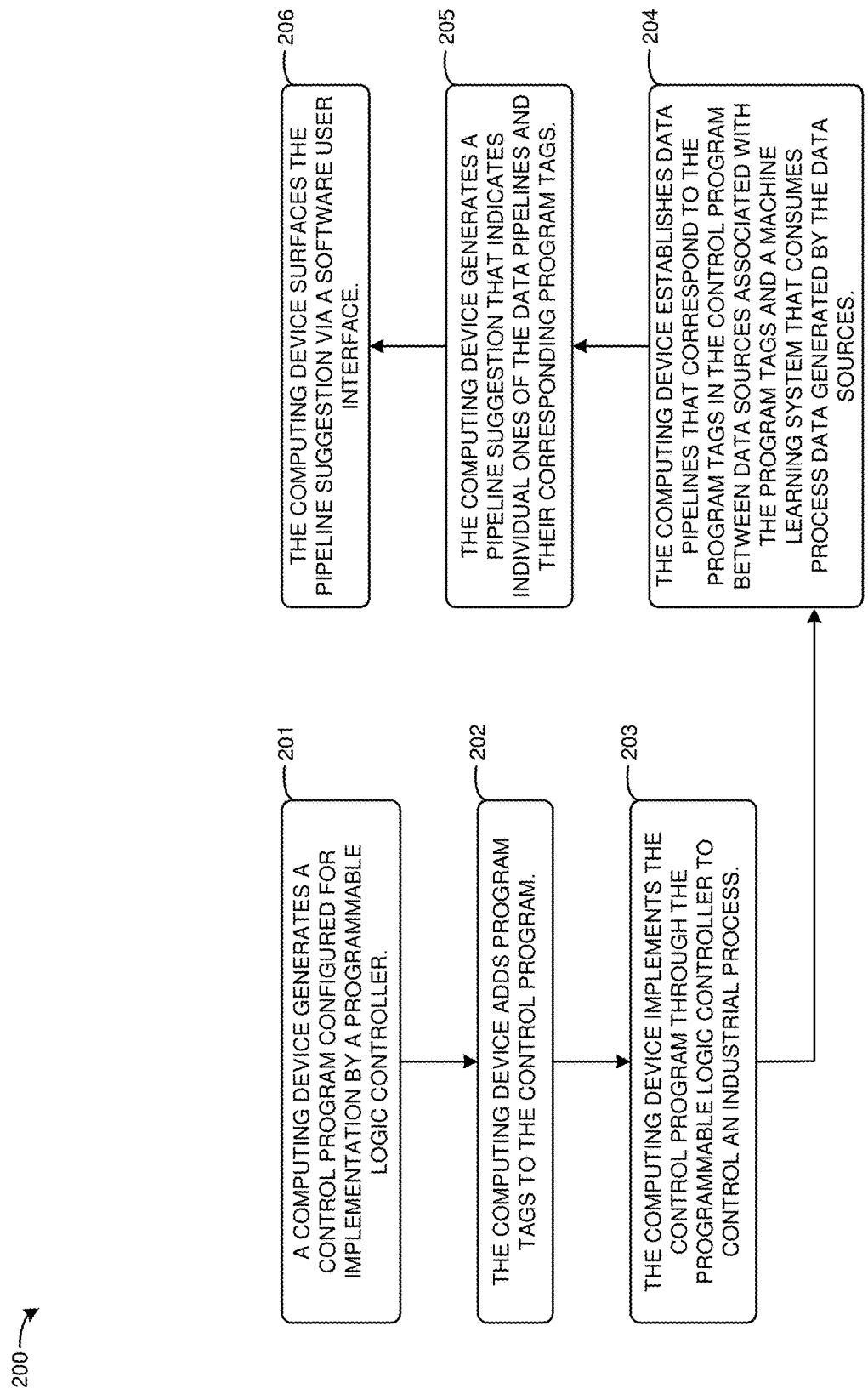
FIG. 2 illustrates an exemplary operation of an industrial automation environment to surface data pipelines in the industrial automation environment.

In some examples, industrial automation environment 100 implements process 200 illustrated in FIG. 2. It should be appreciated that the structure and operation of industrial automation environment 100 may differ in other examples.

FIG. 2 illustrates process 200. Process 200 comprises a data pipeline surfacing process. Program 200 may be implemented in program instructions in the context of any of the software applications, module components, or other such elements of one or more computing devices. The program instructions direct the computing device(s) to operate as follows, referred to in the singular for the sake of clarity.

In operation, a computing device generates a control program configured for implementation by a Programmable Logic Controller (PLC) (201). The computing device adds program tags to the control program (202). The computing device implements the control program through the PLC to control an industrial process (203). The computing device establishes data pipelines that correspond to the program tags in the control program between data sources associated with the program tags and a machine learning system that consumes process data generated by the data sources (204). The computing device generates a pipeline suggestion that indicates individual ones of the data pipelines and their corresponding program tags (205). The computing device surfaces the pipeline suggestion via a software user interface (206).

Referring back to FIG. 1, industrial automation environment 100 includes a brief example of process 200 as employed by one or more applications hosted in programming environment 101 and data science environment 121. In operation, a design application hosted by computing device 102 generates control program 104 (201). For example, a user may interact with the design application via user interface 103. The design application may receive user inputs via user interface 103 that direct the design application to generate control program 104. The design application may generate control program 104 and present a visual representation of control program 104 on user interface 103. The design application hosted by computing device 102 adds program tags 105-107 to control program 104 (202). Program tags 105-107 comprise control code that correspond to industrial devices 142-144. The program tags may comprise control code to control individual components of industrial devices 142-144. For example, program tag 105 may comprise control code to control temperature output of industrial device 142 and program tag 106 may comprise control code to drive an electric motor of industrial device 143. The design application may receive user inputs via user interface 103 that drive the design application to add program tags 105-107 to control program 104. For example, the user inputs may comprise drag and drop actions, selects, or some other type of guided user interface action that directs the design application to add program tags 105-107 to control program 104. The design application presents a visual representation of program tags 105-107 on user interface 104.

The design application hosted by computing device 102 implements control program 104 through PLC 131 to control industrial process 141 (203). The design application may drive transceiver circuitry in computing device 102 to transfer control program 104 to PLC 131 over an industrial ethernet link. PLC 131 receives and executes control program 104. PLC 131 transfers executed instructions to their corresponding devices. For example, PLC 131 may receive and execute program tag 105, identify that program tag corresponds to industrial device 142, and transfer executed instructions generated by executing program tag 105 to industrial device 142. PLC 131 may determine a device Identification (ID) code for each of program tags 105-107 to determine which industrial devices program tags 105-107 correspond to. Industrial devices 142-144 receive the executed instructions from PLC 131 and responsively operate according to the executed instructions. As industrial devices 142-144 operate, they generate process data that indicates their respective operations. For example, industrial device 142 may comprise a furnace and generate process data that indicates its operating temperature. Industrial devices 142-144 transfer their process data to computing device 102 via PLC 131.

The design application hosted by the computing device 102 establishes data pipelines 112-114 with machine learning model repository 122 (204). Data pipelines 112-114 connect machine learning model repository 122 with computing device 102 to transfer process data generated by industrial devices 142-144. The data pipelines allow machine learning model 123 to ingest the process data generated by industrial devices 142-144. Each of data pipelines 112-114 correspond to program tags 105-107 in control program 104. In some examples, the design application establishes each of data pipelines 112-114 in response to adding program tags 105-107 to control program 104. For example, the design application may receive user inputs that direct the design application to add program tag 105 to the control program. The design application may add program tag 105 to the control program and responsively establish data pipeline 112 to transfer process data associated with program tag 105.

A pipeline management application hosted by machine learning model repository 122 generates a pipeline suggestion that indicates data pipelines 112-114. The pipeline suggestion may indicate various data pipeline indices for each of data pipelines 112-114 like the type of process data, the associated program tag, the associated industrial device, whether the pipeline is active or not, and the like. The pipeline management application surfaces the pipeline suggestion as pipeline status modules 125-127 via user interface 124. Pipeline status modules 125-127 provide a visual representation of the various pipeline indices for data pipelines 112-114. For example, pipeline status module 125 may present a visual representation that indicates pipeline 112 is active, that it is associated with tag 105, that it feeds machine learning model 123, and that it transfers process data generated by a temperature sensor of industrial device 142.

Advantageously, industrial automation environment 100 efficiently establishes data pipelines 112-114 with machine learning model 123 for program tags 105-107 industrial process. Moreover, industrial automation environment 100 effectively tracks and surfaces associations between program tags 105-107, data pipelines 112-114, and machine learning model 123.

Figure 3:
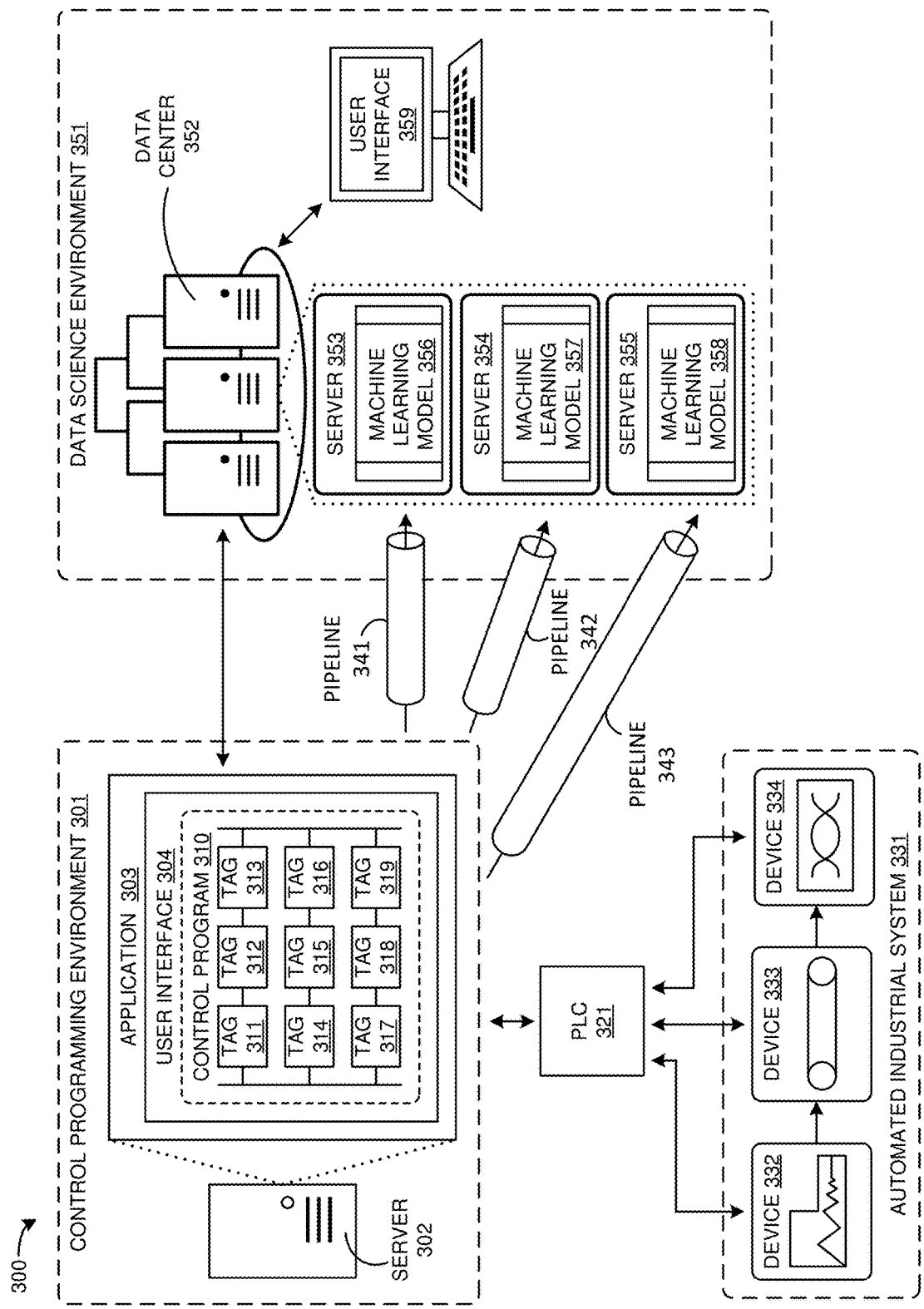
FIG. 3 illustrates an exemplary industrial automation environment to surface data pipelines in the industrial automation environment.

FIG. 3 illustrates an industrial automation environment 300 to surface data pipelines in an automated industrial process. Industrial automation environment 300 comprises an example of industrial automation environment 100, however environment 100 may differ. Industrial automation environment 300 comprises control programming environment 301, Programmable Logic Controller (PLC) 321, automated industrial system 331, data pipelines 341-343, and data science environment 351. Control programming environment 301 comprises server 302, application 303, user interface 304, and control program 310. Control program 310 comprise program tags 311-319 and is representative of a ladder logic diagram configured for ingestion by PLC 321. Automated industrial system 331 comprises industrial devices 332-335. Data science environment 351 comprises data center 352, servers 353-355, machine learning models 356-358, and user interface 359.

Control programming environment 301 is representative of one or more computing devices integrated into a network configured to generate control instructions for industrial automation environment 300. Control programming environment 301 comprises server 302. Server 302 is representative of one or more computing device configured to host application 303. The one or more computing devices may comprise processors, bus circuitry, storage devices, software, and the like. The processors may comprise Central Processing Units (CPUs), Graphical Processing Units (GPUs), Application Specific Integrated Circuits (ASICs), and the like. The storage devices comprise flash drives, Random Access Memory (RAM), Hard Disk Drives (HDDs), Solid State Drives (SSDs), Non-Volatile Memory Express (NVMe) SSDs, and the like. The storage devices store the software. The processors may retrieve and execute software stored on the storage devices to drive the operation of application 303.

Application 303 is representative of one or more design applications, machine learning interface applications, pipeline management applications, user interface applications, operating systems, modules, and the like. Application 303 is configured to receive user inputs via user interface 304 and generate control program 310 based on the user inputs and/or other types of inputs. Application 303 may be further configured to manage the establishment of data pipelines 341-343.

User interface 304 is representative of a display that provides a graphical representation of application 303. The graphical representation may include one or more visual indicators relevant to control program 310, such as visual indicators of visual code blocks, ladder logic, code chunks, functional block diagrams, machine learning optimizations, and/or other types of visual indictors. User interface 304 may comprise a faceplate, display screen, or some other type of viewing apparatus for use by an operator within control programming environment 301. User interface 304 may include a computer, a mobile device, a kiosk, a touchscreen device, a Human Machine Interface (HMI) or some other type of computing device capable of performing the user interface functions described herein. A user may interact with application 303 via user interface 304 to generate control program 310. Upon generation of control program 310, application 303 may transfer control program 310 to PLC 321 for execution.

PLC 321 is representative of an industrial controller configured to execute a control program (e.g., control program 310) to implement an automated industrial process in industrial system 331. PLC 321 comprises one or more computing devices. The one or more computing devices of PLC 321 comprise processors, bus circuitry, storage devices, software, and the like. The processors may comprise CPUs, GPUs, ASICs, and the like. The storage devices comprise flash drives, RAM, HDDs, SSDs, NVMe SSDs, and the like. The storage devices store the software. The processors may retrieve and execute software stored on the storage devices to drive the operation of PLC 321.

PLC 321 is coupled to server 302 and to industrial devices 332-335. PLC 321 receives and implements control program 310 from computing device 102 to control the operation of devices 332-335. Program tags 311-319 that constitute control program 104 comprise industrial control code that provide instructions for PLC 321 to control the operations of devices 332-335. PLC 321 identifies which tags of control program 104 correspond to the ones of devices 332-335. For example, PLC 321 may determine the tags 311-313 are on a ladder logic rung for industrial device 332 and may implement the control instructions of tags 311-313 to drive the operation of the various components of industrial device 332.

Automated industrial system 331 is representative of an automated industrial process. The industrial processes may comprise a manufacturing process, chemical production process, food processing process, or any other type of automated industrial process. Although automated industrial system 331 is depicted with four industrial devices, in other examples automated systems may comprise a different number of industrial devices. Industrial devices 332-335 may comprise devices like motors, pumps, compressors, heat exchanges, centrifuges, mills, conveyers, filters, and the like. Industrial devices 332-335 may comprise subcomponents (not illustrated for clarity) like motors, valves, electrical circuitry, processing circuitry, storage circuitry, transceivers, machined parts, and the like.

Industrial devices 332-335 are coupled to PLC 321. PLC 321 transfers executed program instructions to automated industrial system 331 to implement their respective industrial processes. Industrial devices 332-335 receive their respective instructions and responsively operate according to the instructions. For example, industrial device 332 may comprise an electric motor to drive a mill. PLC 321 may execute the control instructions and determine a current level to power the electric motor at to achieve a desired rotations per minute in the mill. PLC 321 may transfer the executed instructions to the motor in industrial device 332. The motor in industrial device 332 may receive the executed instructions and apply the indicated current level to achieve the necessary power level for the electric motor to drive the motor at the desired rotations per minute.

As industrial devices 332-335 operate based on control program 310, they generate operational process data. The process data indicates the status of variables, operations, and/or processes of industrial devices 332-335. Industrial devices 332-335 report operational process data to PLC 321. For example, industrial device 332 may comprise a conveyor belt and may continuously report it movement speed to PLC 321 as operational process data. PLC 321 reports the operational process data to application 303 via server 302.

Data pipelines 341-343 comprise data transfer systems that communicatively couple control programming environment 301 with data science environment 351. Data pipelines 341-343 each individually comprise a set data processing elements connected in series. The data processing elements of data pipelines 341-343 comprise processors, bus circuitry, storage devices, software, and the like. The processors may comprise CPUs, GPUs, ASICs, and the like. The storage devices comprise flash drives, RAM, HDDs, SSDs, NVMe SSDs, and the like. The storage devices store the software. The processors may retrieve and execute software stored on the storage devices to drive the operation of data pipelines 341-343.

Data pipelines 341-343 may transfer process data generated by industrial devices 342-344 from control programming environment 301 for delivery to machine learning models 355-358. Data pipelines 341-343 may perform processing operations on the data prior to reception by machine learning models 356-358. For example, data pipeline 341 may receive raw process data, implement a feature extraction process on process data to generate feature vectors that represent the process data, and transfer the feature vectors to server 353 for delivery to machine learning model 356. Data pipelines 341-343 may correspond to tags within control programming environment 301. For example, data pipeline 341 may correspond to tag 311-313, data pipeline 342 may correspond to tag 314, and data pipeline 343 may correspond to tags 315-319. In some examples, application 303 instantiates ones of data pipelines 341-343 in response to adding a program tag(s) to control program 310. For example, upon the addition of program tag 311 to the control program, application 303 may establish data pipeline 341 with server 353 to transfer process data associated tag 311 to machine learning model 356.

Data science environment 351 comprises data center 352 and user interface 359. Data center 352 is representative of one or more computing devices integrated into a network that communicates with application 303 and user interface 359. Examples of data center 352 may include server computers and data storage devices deployed on-premises, in the cloud, in a hybrid cloud, or elsewhere, by service providers such as enterprises, organizations, individuals, and the like. Data center 352 may rely on the physical connections provided by one or more other network providers such as transit network providers, Internet backbone providers, and the like to communicate with application 303. Data center 352 comprises server computers 353-354 which host machine learning models 356-358 respectively.

Server computers 353-355 comprise processors, bus circuitry, storage devices, software, and the like configured to host machine learning models 356-358. The processors may comprise CPUs, GPUs, ASICs, and the like. The storage devices comprise flash drives, RAM, HDDs, SSDs, NVMe SSDs, and the like. The storage devices store the software. The processors may retrieve and execute software stored on the storage devices to drive the operation of machine learning models 356-358.

Machine learning models 356-358 are hosted on server computers 353-355. Machine learning models 356-358 comprise one or more machine learning algorithms that are trained to determine control optimizations for automated industrial system 331. Machine learning models 356-358 may employ one or more machine learning algorithms through which data can be analyzed to identify patterns, make decisions, make predictions, or similarly produce output that can inform control code and/or parameters. Examples of machine learning algorithms that may be employed solely or in conjunction with one another include artificial neural networks, nearest neighbor methods, ensemble random forests, support vector machines, naïve Bayes methods, linear regressions, or other types of machine learning algorithms that predict output data based on input data. Determining which machine learning methods to use may depend on the specific purpose or functions required in a particular industrial setting. The specific machine learning algorithms employed by machine learning models 356-358 may differ between one another.

Machine learning models 356-358 may ingest training data like control programs, ladder logic, block diagrams, image files, performance metrics, and/other training data as inputs from control programming environment 301. Machine learning model 356 may utilize supervised learning methods, unsupervised learning methods, and/or reinforcement learning methods to train itself. The training data may be formatted as feature vectors that comprise numeric representations of the training data. In some examples, machine learning models 356-358 ingest feature vectors that represent process data generated by automated industrial system 331 via data pipelines 341-343. Machine learning models 356-358 may process the ingested feature vectors to generate machine learning outputs that comprise optimizations for industrial system 331. The optimizations allow for increased control over industrial system 331. Machine learning models 356-358 may indicate the machine learning outputs to application 303 or to user interface 359. For example, machine learning models 356-358 may drive data center 352 to transfer a message comprising the machine learning outputs to server 302 for delivery to application 303.

User interface 359 is representative of a user terminal that provides access to data center 352. The graphical representation may include one or more visual indicators relevant data pipelines 341-443, such as visual indicators of pipeline status, program tag associations, process data type, data processing operations, machine learning model destinations, and the like. User interface 304 may comprise a faceplate, display screen, or some other type of viewing apparatus for use by an operator within data science environment 351. User interface 359 may include a computer, a mobile device, a kiosk, a touchscreen device, a Human Machine Interface (HMI) or some other type of computing device capable of performing the user interface functions described herein. A user may interact with application applications hosted by data center 352 via user interface 359 to access the status of data pipelines 341-343.

Figure 4:
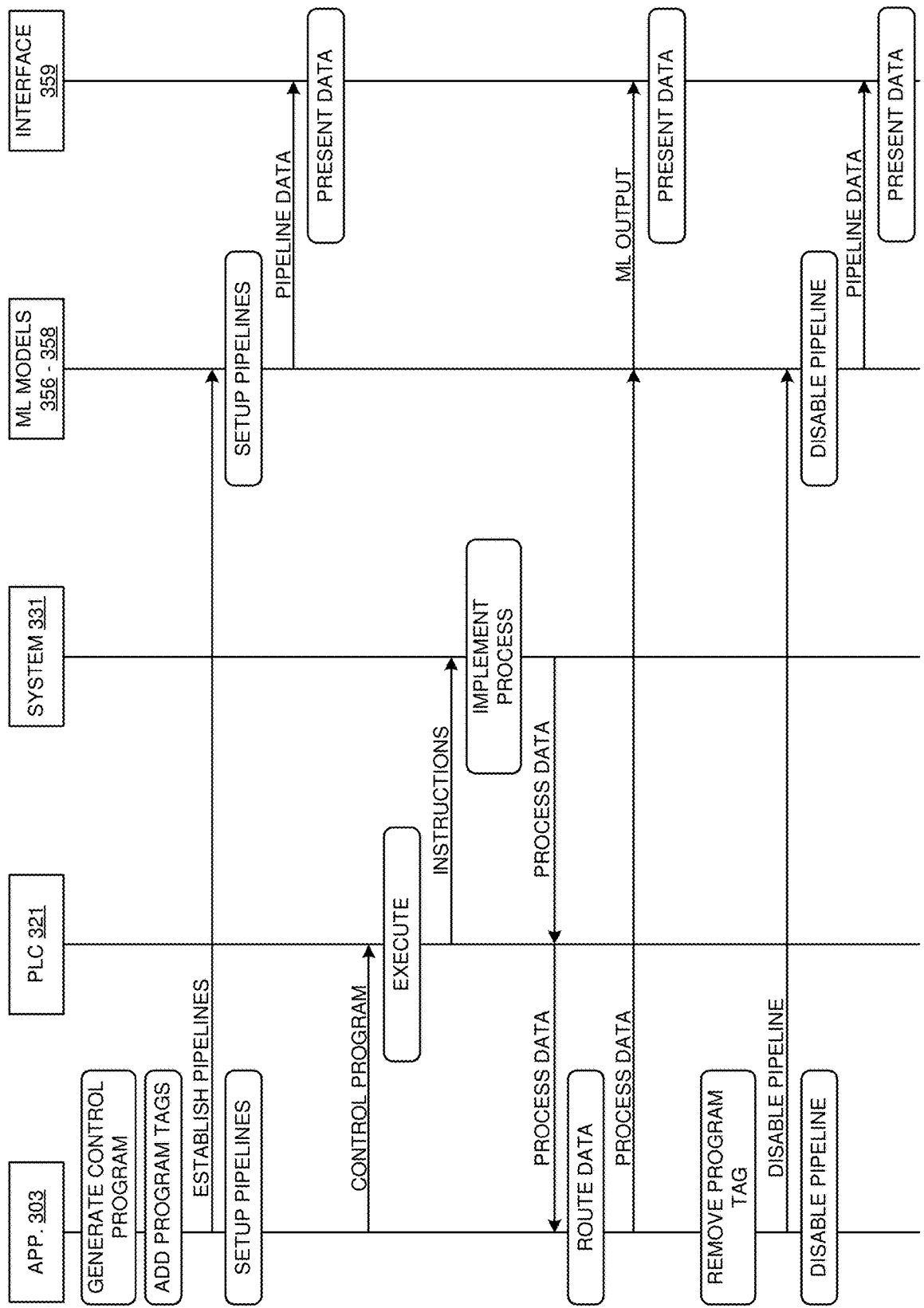
FIG. 4 illustrates an exemplary operation of an industrial automation environment to surface data pipelines in the industrial automation environment.

In some examples, industrial automation environment 300 implements a process illustrated in FIG. 4. It should be appreciated that the structure and operation of industrial automation environment 300 may differ in other examples.

FIG. 4 illustrates an exemplary operation of industrial automation environment 300 to surface data pipelines in an industrial automation environment. The operation depicted by FIG. 4 comprises an example of process 200 illustrated in FIG. 2, however process 200 may differ. In other examples, the structure and operation of industrial automation environment 300 may be different.

In operation, application 303 hosted by server 302 generates control program 310. Application 303 may receive user inputs from a programmer, operator, or human user via user interface 304 that directs application 310 to generate control program 310. In response to the user inputs, application 303 generates control program 310 and graphically presents control program 310 on user interface 304. Control program 310 provides a template that allows a user to create program instructions for implementation by PLC 321 to control industrial system 331. Control program 310 comprises a ladder logic diagram, however in other examples, control program may comprise a functional block diagram and/or some other type of control program.

Application 303 receives user inputs via user interface 304 that direct application 303 to add program tags 311-319 to control program 310. Program tags 311-319 comprise control code that corresponds to process, devices, variables, outputs, inputs, and the like within industrial system 331. For example, program tag 313 may comprise control code that directs a pressure sensor of industrial device 332 to measure and report device pressure. In response to the addition of program tags 311-319 to control program 310, application 303 directs machine learning models 356-359 to establish data pipelines 341-343. Application 303 may drive transceiver circuitry of server 302 to transfer a message comprising the pipeline instruction to servers 353-355 to establish the data pipelines. Machine learning models 356-358 receive the message. Application 303 and machine learning models 356-358 responsively establish data pipelines 341-343.

Each of data pipelines 341-343 correspond to one or more of program tags 311-319. Machine learning models 356-358 are configured to ingest process data received via data pipelines 341-343. Machine learning models 356-358 may be trained to specifically ingest certain types of process data. For example, machine learning model 356 may be configured to ingest process data associated with program tags 311-313 and as a result, data pipeline 341 may be configured to transfer process data for program tags 311-313 to machine learning model 356. Machine learning models 356-358 transfer data pipeline status data to user interface 359. For example, machine learning models 356-358 may drive transceiver circuitry in servers 353-355 to transfer data pipeline status data for presentation on user interface 359.

User interface 359 receives and graphically presents the data pipeline status data. The status data indicates the program tags associated with data pipelines 341-343, the machine learning models associated with data pipelines 341-343, the types of data transferred by data pipelines 341-343, and/or other types of status data. For example, user interface 359 may present a status module for data pipeline 341 that indicates its association with tags 311-313, its association with machine learning model 356, and that it transfers process data generate by industrial device 332.

Once data pipelines 341-343 are established, application 303 transfers control program 310 to PLC 321 to implement an industrial process in industrial system 331. PLC 321 receives and executes control program 310. PLC 321 transfers executed instructions to industrial devices 332-334 in industrial system 331. Industrial devices 332-334 receive the executed instructions and responsively operate according to the executed instructions. Industrial devices 332-334 of industrial system 331 generate process data as they operate. For example, a flowmeter of industrial device 334 may generate process data that indicates a volumetric flowrate of an output material generated by industrial device 334. It should be understood that the specific type of process data generated by industrial system 331 depends in part on the types of devices that comprise industrial devices 332-334. Industrial devices 332-334 of industrial system 331 transfer the process data to PLC 321. PLC 321 transfers the process data for delivery to application 303.

Application 303 receives the process data generated in industrial system 331. Application 303 routes the process data to data pipelines 341-343. For example, application 303 may determine a set of the process data may be associated with program tags 311-313 and responsively route that set of process data to the data pipeline established for program tags 311-313. Application 303 transfers the process through data pipelines 341-343 for delivery to machine learning models 356-358. For example, data pipelines 341-343 may perform data processing operations on the process data like feature extraction operations and transfer the processed data for delivery to machine learning models 356-358. Machine learning models 356-358 ingest the process data and generate a machine learning output. For example, Machine learning models 356-358 may ingest feature vectors that represent the process data and generate machine learning outputs that indicate control optimizations for industrial system 331. Machine learning models 356-358 transfer their machine learning outputs for presentation on user interface 359. User interface 359 present the machine learning outputs for viewing by an operator. In some examples, machine learning models 356-358 also transfer their machine learning outputs to application 303. In these examples, application 303 may receive the machine learning outputs and may modify control program 310 based on the outputs.

Application 303 receives user inputs via user interface 304 to modify control program 310. The user inputs direct application 303 to remove one or more of program tags 311-319 from control program 310. Application 303 identifies which data pipeline(s) of data pipelines 341-343 transfer data for the removed tags. Application 303 transfers a message directing the machine learning model of machine learning models 356-358 that receives process data from the identified pipeline to disable the identified pipeline. The machine learning model receives the message. Application 303 and the machine learning model disable the identified pipeline. For example, the user inputs may comprise a command to remove tags 317-319 from control program 310, and application 303 may responsively remove program tags 317-319 from control program 310. Application 303 may identify that data pipeline 343 is associated with removed program tags 317-319 and is associated with machine learning model 355. Application 303 may transfer a message for delivery to machine learning model 355 to disable data pipeline 343. Application 303 and machine learning model 355 may then disable data pipeline 343.

Returning to the operation, once the identified data pipeline has been disabled, the machine learning model that disabled the identified data pipeline transfers pipeline data that indicates the disabled pipeline to user interface 359. User interface 359 presents the indication for view by a user. For example, if data pipeline 343 was disable, user interface may receive and graphically present a message that data pipeline 343 is no longer active and that the corresponding program tags were removed from control program 310.

Figure 5:
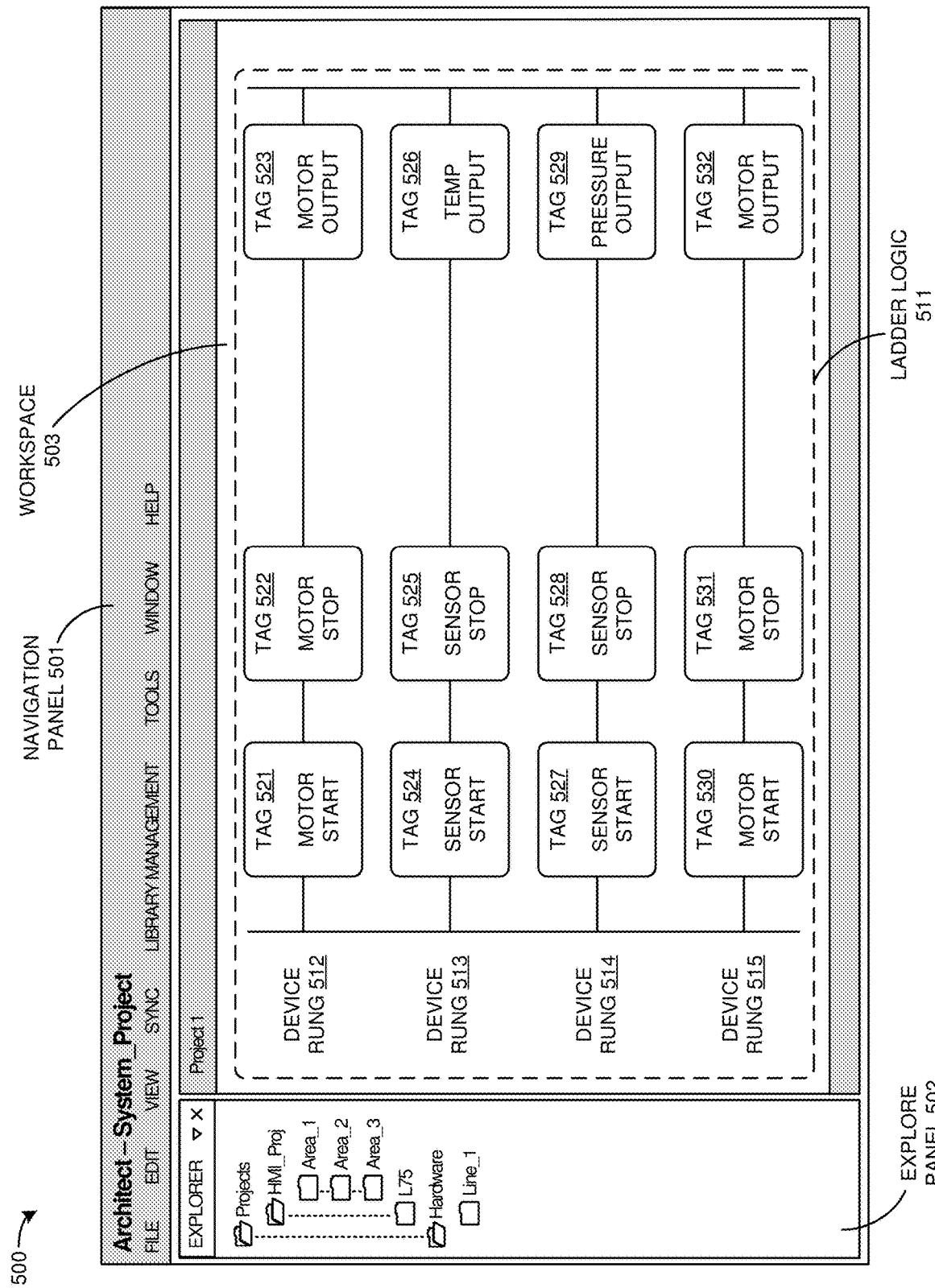
FIG. 5 illustrates an exemplary user interface in an industrial automation environment.

FIG. 5 illustrates user interface 500 to surface data pipelines in an automated industrial environment. User interface 500 comprises an example of user interface 103 and user interface 304, however user interface 103 and user interface 304 may differ. User interface 500 comprises a programming environment presented on a display screen which is representative of any user interface for generating control code. For example, user interface 501 may comprise a Guided User Interface (GUI) configured to allow a user to interact with a design application to generate control program represented as a ladder logic diagram.

User interface 500 includes navigation panel 501 that allows a user to access the various features available through user interface. Navigation panel 501 comprises tabs like "FILE", "EDIT", "VIEW", "LIBRARY MANAGEMENT", "TOOLS", "WINDOW", and "HELP". In other examples, navigation panel 501 may comprise fewer tabs, more tabs, and/or different types of tabs. A user may select a tab to access the functionality of the tab. Upon selection, the tabs may open drop down menus that list their functionality. For example, a user may select the "FILE" tab and select an option from a drop-down menu to save a project to memory. Navigation panel 501 is located on a top portion of user interface 500 however navigation panel 501 may be located on a different portion of user interface 500. For example, navigation panel 501 may be located on the bottom portion of user interface 500.

User interface 500 incudes explore panel 502. Explore 502 panel comprises a file navigation system that allows a user to access various projects and view information. The files comprise names like "Projects", "HMI_Proj", "Area_2", "Area_2", "Area_3", "L75", "Hardware", and "Line_1". The files are organized in a hierarchy. A user may select one of the files to access the contents stored within the file. For example, a user may select the "L75" folder to access its contents. Explore panel 502 is located on a left portion of user interface 500 however explore panel 502 may be located on a different portion of user interface 500. For example, explore panel 502 may be located on the right portion of user interface 500.

User interface 500 includes workspace 503. Workspace 503 comprises ladder logic 511. Ladder logic 511 is an example of a control program configured implementation of a Programmable Logic Controller (PLC). A user may interact with user interface 500 to construct ladder logic 511 on workspace 503. Ladder logic 511 is organized into rungs 512-515. In this example, each of rungs 512-515 comprise a set of program tags that comprise control instruction for an industrial device within an industrial automation environment. Device rung 512 comprises tags 521-523, device rung 513 comprises tags 524-526, device rung 514 comprises tags 527-529, and device rung 515 comprises tags 530-532. For example, a PLC may execute the control instructions formed by tags 521-523 of device rung 512 to control the operation of a corresponding industrial device. Each of tags 521-532 comprise control instructions that direct their corresponding industrial device to perform a specific action. For example, tag 524 comprises a sensor start command, tag 525 comprises a sensor stop command, and tag 525 comprises a sensor output command. In other examples, some or all of tags 521-532 may comprise different types of control instructions. When tags 521-532 are added to ladder logic diagram 511, a design application may establish data pipelines to transfer data for program tags 521-532. The design application may transfer ladder logic diagram 511 for implementation by a programmable logic controller.

Figure 6:
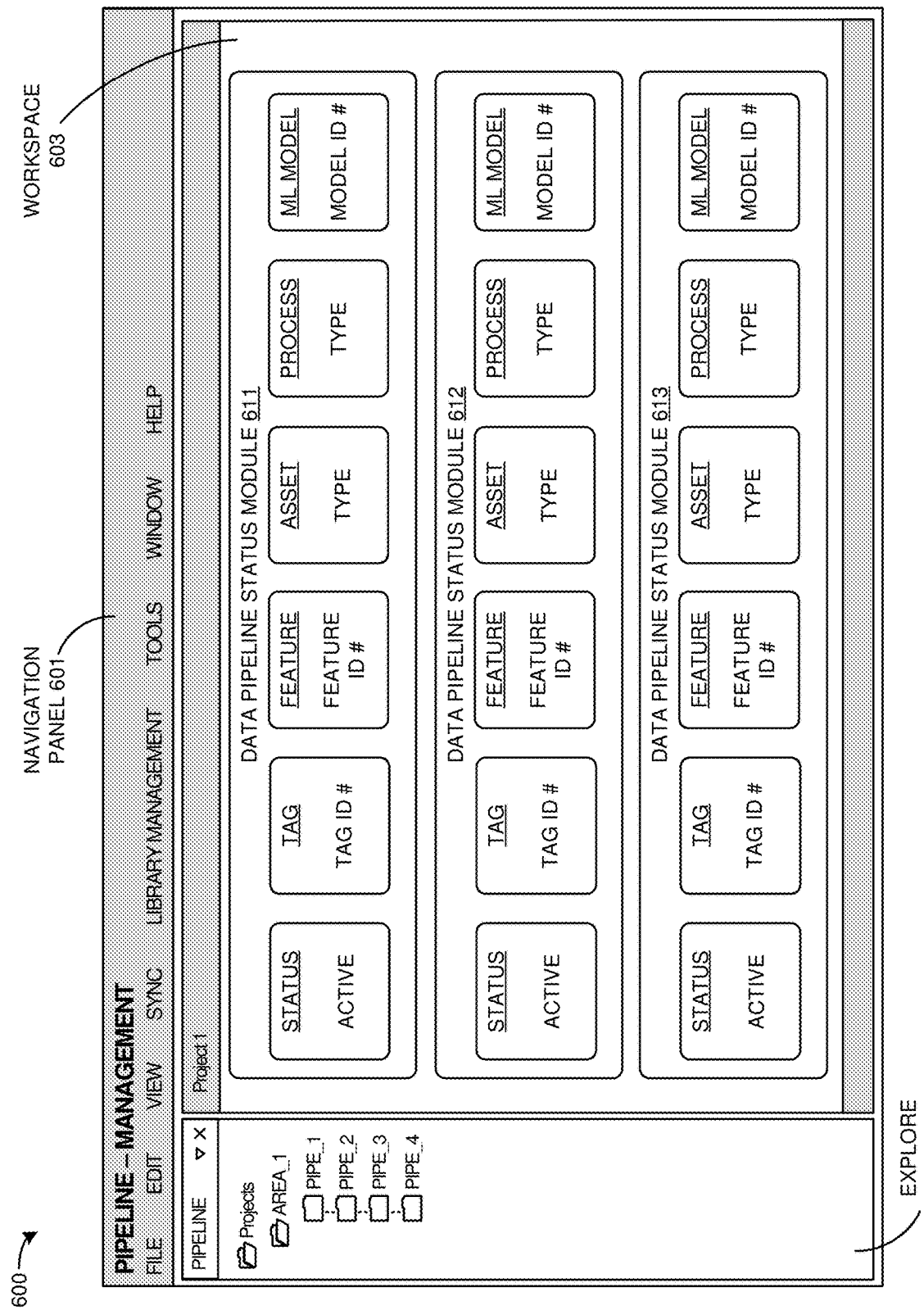
FIG. 6 illustrates an exemplary user interface in an industrial automation environment.

FIG. 6 illustrates user interface 600 to surface data pipelines in an industrial automation environment. User interface 600 comprises an example of user interface 124 and user interface 359, however user interface 124 and user interface 359 may differ. User interface 600 comprises a data science environment presented on a display screen which is representative of any user interface for viewing data pipeline status information. For example, user interface 601 may comprise a graphical representation on a display screen of a computing device that allows a user to interact with a pipeline monitoring application to view the status of data pipelines, their associated program tags, and their associated machine learning models.

User interface 600 includes navigation panel 601 that allows a user to access the various features available through user interface. Navigation panel 601 comprises tabs like "FILE", "EDIT", "VIEW", "LIBRARY MANAGEMENT", "TOOLS", "WINDOW", and "HELP". In other examples, navigation panel 601 may comprise fewer tabs, more tabs, and/or different types of tabs. A user may select a tab to access the functionality of the tab. Upon selection, the tabs may open drop down menus that list their functionality. For example, a user may select the "FILE" tab and select an option from a drop-down menu to save a project to memory. Navigation panel 601 is located on a top portion of user interface 600 however navigation panel 601 may be located on a different portion of user interface 600. For example, navigation panel 601 may be located on the bottom portion of user interface 600.

User interface 600 incudes explore panel 602. Explore 602 panel comprises a file navigation system that allows a user to access the status of data pipelines and view information. The files comprise names like "Projects", "AREA_1", "PIPE_1", "PIPE_2", "PIPE_3", and "PIPE_4". The files are organized in a hierarchy. A user may select one of the files to access the contents stored within the file. For example, a user may select the "AREA_1" folder to access its contents. Explore panel 602 is located on a left portion of user interface 600 however, explore panel 602 may be located on a different portion of user interface 600. For example, explore panel 602 may be located on the right portion of user interface 600.

User interface 600 includes workspace 603. Workspace 603 comprises data pipeline statues modules 611-613. Data pipelines status modules 611-613 comprise visual indicators for pipeline status, tag identification, industrial asst types, industrial process type, and machine learning model identification. Each of data pipeline status modules 611-613 correspond to a data pipeline in an industrial automation environment. The pipeline status indictor shows whether a pipeline is currently transferring process data or is inactive. The tag identification indicator shows the program tag(s) associated with the data pipeline. The feature identification indicator shows what machine learning feature is associated with the data pipeline. The asset indicator shows what type of device generates the process data transferred by the data pipeline. The process indicator shows what type of process the industrial asset belongs to. The machine learning model indicator shows which machine learning model is ingesting data for the data pipeline. Data pipeline status module 611 may have a live connection and update their indicators in response to changes in the data pipelines. For example, a tag may be removed from a control program and its corresponding data pipeline may be disabled and as a result, data pipeline status module 611 may change the status indicator from "ACTIVE" to "INACTIVE". In some examples, when new tags are added to a control program and additional data pipelines are instantiated, user interface 600 may add additional data pipeline status modules to workspace 603 for the instantiated pipelines. In other examples, the number and/or type of visual indicators of data pipeline status modules 611-613 may differ.

Figure 7:
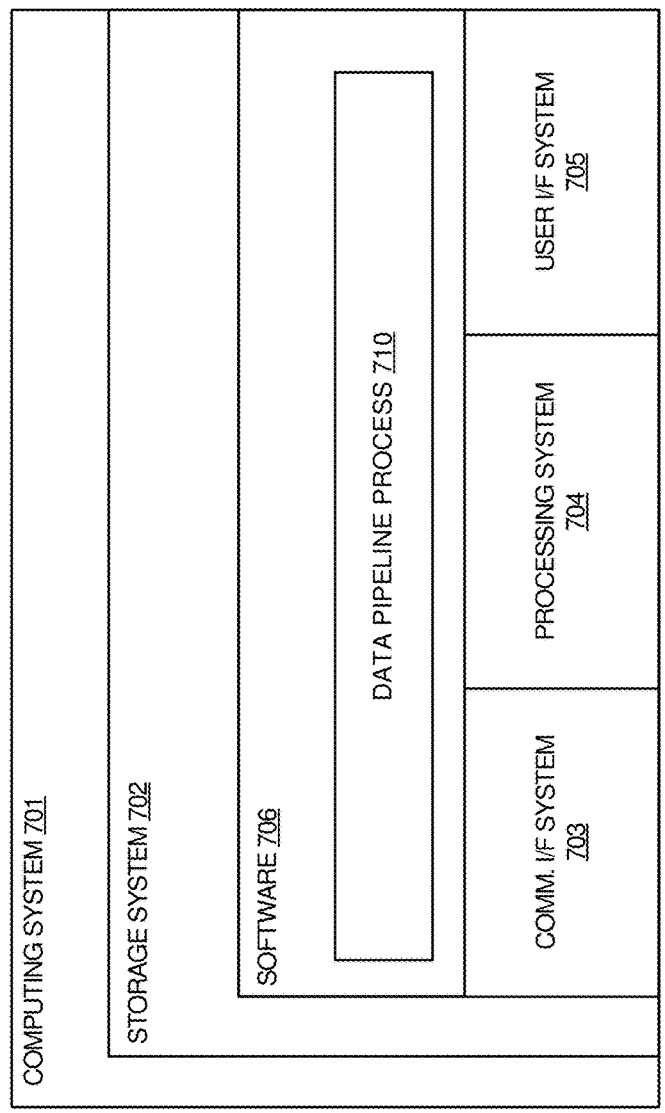
FIG. 7 illustrates an exemplary computing device that may be used in accordance with some embodiments of the present technology.

FIG. 7 illustrates computing system 701 to surface data pipelines according to an implementation of the present technology. Computing system 701 is representative of any system or collection of systems with which the various operational architectures, processes, scenarios, and sequences disclosed herein for utilizing machine learning models within industrial automation environments may be employed. For example, computing system 701 may be representative of computing device 102, data pipeline system 111, machine learning model repository 122, PLC 131, server 302, PLC 321, data pipelines 341-343, servers 353-355, user interface 359, and/or any other computing device contemplated herein. Computing system 701 may be implemented as a single apparatus, system, or device or may be implemented in a distributed manner as multiple apparatuses, systems, or devices. Computing system 701 includes, but is not limited to, processing system 704, storage system 702, software 706, communication interface system 703, and user interface system 705. Processing system 704 is operatively coupled with storage system 702, communication interface system 703, and user interface system 705.

Processing system 704 loads and executes software 706 from storage system 702. Software 706 includes and implements data pipeline process 710, which is representative of any of the data pipeline surfacing processes discussed with respect to the preceding Figures, including but not limited to the data pipeline creation and data pipeline status visualization processes. For example, data pipeline process 710 may be representative of process 200 illustrated in FIG. 2 and/or the exemplary operation of environment 300 illustrated in FIG. 4. When executed by processing system 704 to perform pipeline surfacing functions, software 706 directs processing system 704 to operate as described herein for at least the various processes, operational scenarios, and sequences discussed in the foregoing implementations. Computing system 701 may optionally include additional devices, features, or functionality not discussed for purposes of brevity.

Processing system 704 may comprise a micro-processor and other circuitry that retrieves and executes software 706 from storage system 702. Processing system 704 may be implemented within a single processing device but may also be distributed across multiple processing devices or sub-systems that cooperate in executing program instructions. Examples of processing system 704 include general purpose central processing units, graphical processing units, application specific processors, and logic devices, as well as any other type of processing device, combinations, or variations thereof.

Storage system 702 may comprise any computer readable storage media readable by processing system 704 and capable of storing software 706. Storage system 702 may include volatile, nonvolatile, removable, and/or non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 702 may also include computer readable communication media over which at least some of software 706 may be communicated internally or externally. Storage system 702 may be implemented as a single storage device but may also be implemented across multiple storage devices or sub-systems co-located or distributed relative to each other. Storage system 702 may comprise additional elements, such as a controller, capable of communicating with processing system 704 or possibly other systems.

Software 706 (including data pipeline process 710) may be implemented in program instructions and among other functions may, when executed by processing system 704, direct processing system 704 to operate as described with respect to the various operational scenarios, sequences, and processes illustrated herein. For example, software 706 may include program instructions for created data pipelines for program tags when the program tags are added to a control program and surfacing pipeline data as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 706 may include additional processes, programs, or components, such as operating system software, virtualization software, or other application software. Software 706 may also comprise firmware or some other form of machine-readable processing instructions executable by processing system 704.

In general, software 706 may, when loaded into processing system 704 and executed, transform a suitable apparatus, system, or device (of which computing system 701 is representative) overall from a general-purpose computing system into a special-purpose computing system customized to provide machine learning functionality to an industrial automation environment as described herein. Indeed, encoding software 706 on storage system 702 may transform the physical structure of storage system 702. The specific transformation of the physical structure may depend on various factors in different implementations of this description. Examples of such factors may include, but are not limited to, the technology used to implement the storage media of storage system 702 and whether the computer-storage media are characterized as primary or secondary storage, as well as other factors.

For example, if the computer readable storage media are implemented as semiconductor-based memory, software 706 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 703 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and an extended discussion of them is omitted for the sake of brevity.

While some examples provided herein are described in the context of data pipeline instantiation and surfacing computing devices, it should be understood that the systems and methods described herein are not limited to such embodiments and may apply to a variety of other extension implementation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 122(f) will begin with the words "means for" but use of the term "for" in any other context is not intended to invoke treatment under 35 U.S.C. § 122(f). Accordingly, the applicant reserves the right to pursue additional claims after filing this application to pursue such additional claim forms, in either this application or in a continuing application.

What is claimed is:

1. A system to surface data pipelines in an industrial automation environment, the system comprising:
   a memory that stores executable components; and
   a processor, operatively coupled to the memory, that executes the executable components, the executable components comprising:
   a design component configured to generate a control program configured for implementation by a programmable logic controller to control an industrial process, add program tags to the control program, and implement the control program through the programmable logic controller;
   the design component configured to establish the data pipelines that correspond to the program tags in the control program between data sources associated with the program tags and a machine learning system that consumes process data generated by the data sources;
   a pipeline management component configured to generate a pipeline suggestion that indicates individual ones of the data pipelines and their corresponding program tags and surface the pipeline suggestion via a software user interface;
   the design component configured to receive a user input, remove one of the program tags from the control program based on the user input, identify one of the data pipelines that corresponds to the removed program tag, disable the identified one of the data pipelines, and direct the machine learning system that consumes the process data from the data pipelines to disable the identified one of the data pipelines; and
   the pipeline management component configured to generate a pipeline indication that the one of the data pipelines has been disabled and surface the pipeline indication.

2. The system of claim 1 further comprising:
   a machine learning component configured to receive the process data generated by the data sources over the data pipelines, ingest feature vectors that represent the process data, process the ingested feature vectors using machine learning algorithms, and generate a machine learning output that comprises an optimization for the industrial process.

3. The system of claim 1 wherein, the pipeline management component is configured to surface the pipeline suggestion via the software user interface comprises the pipeline management component configured to present the pipeline suggestion on a display screen.

4. The system of claim 1 wherein the design component is configured to establish the data pipelines between the data sources associated with the program tags and the machine learning system comprises the design component configured to establish the data pipelines between the data sources associated with the program tags and the machine learning system in response to the addition of the program tags to the control program.

5. The system of claim 1 wherein, the data sources comprise industrial assets that carry out the industrial process.

6. The system of claim 1 wherein, the control program comprises a ladder logic diagram.

7. The system of claim 1 wherein, the pipeline management component is configured to generate the pipeline suggestion that indicates the individual ones of the data pipelines and their corresponding program tags comprises the pipeline management component configured to generate the pipeline suggestion that indicates the individual ones of the data pipelines, their corresponding program tags, their corresponding process data types, their associated industrial devices, and whether the individual ones of the data pipelines are active or inactive.

8. A non-transitory computer-readable medium storing instructions to surface data pipelines in an industrial automation environment, wherein the instructions, in response to execution by a processor, cause the processor to drive a system to perform operations comprising:
   generating a control program configured for implementation by a programmable logic controller to control an industrial process, adding program tags to the control program, and implementing the control program through the programmable logic controller;
   establishing the data pipelines that correspond to the program tags in the control program between data sources associated with the program tags and a machine learning system that consumes process data generated by the data sources;
   generating a pipeline suggestion that indicates individual ones of the data pipelines and their corresponding program tags and surfacing the pipeline suggestion via a software user interface;
   receiving a user input, removing one of the program tags from the control program based on the user input, identifying one of the data pipelines that corresponds to the removed program tag, disabling the identified one of the data pipelines, and directing the machine learning system that consumes the process data from the data pipelines to disable the identified one of the data pipelines; and
   generating a pipeline indication that the one of the data pipelines has been disabled and surfacing the pipeline indication.

9. The non-transitory computer-readable medium of claim 8, the operations further comprising:
   receiving the process data generated by the data sources over the data pipelines, ingesting feature vectors that represent the process data, processing the ingested feature vectors using machine learning algorithms, and generating a machine learning output that comprises an optimization for the industrial process.

10. The non-transitory computer-readable medium of claim 8 wherein, surfacing the pipeline suggestion via the software user interface comprises presenting the pipeline suggestion on a display screen.

11. The non-transitory computer-readable medium of claim 8 wherein, establishing the data pipelines between the data sources associated with the program tags and the machine learning system comprises establishing the data pipelines between the data sources associated with the program tags and the machine learning system in response to adding the program tags to the control program.

12. The non-transitory computer-readable medium of claim 8 wherein, the data sources comprise industrial assets that carry out the industrial process.

13. The non-transitory computer-readable medium of claim 8 wherein, the control program comprises a ladder logic diagram.

14. The non-transitory computer-readable medium of claim 8 wherein, generating the pipeline suggestion that indicates the individual ones of the data pipelines and their corresponding program tags comprises generating the pipeline suggestion that indicates the individual ones of the data pipelines, their corresponding program tags, their corresponding process data types, their associated industrial devices, and whether the individual ones of the data pipelines are active or inactive.

15. A method to surface data pipelines in an industrial automation environment, the method comprising:
generating a control program configured for implementation by a programmable logic controller to control an industrial process, adding program tags to the control program, and implementing the control program through the programmable logic controller;
establishing the data pipelines that correspond to the program tags in the control program between data sources associated with the program tags and a machine learning system that consumes process data generated by the data sources;
generating a pipeline suggestion that indicates individual ones of the data pipelines and their corresponding program tags and surfacing the pipeline suggestion via a software user interface;
receiving a user input, removing one of the program tags from the control program based on the user input, identifying one of the data pipelines that corresponds to the removed program tag, disabling the identified one of the data pipelines, and directing the machine learning system that consumes the process data from the data pipelines to disable the identified one of the data pipelines; and
generating a pipeline indication that the one of the data pipelines has been disabled and surfacing the pipeline indication.

16. The method of claim 15 further comprising:
receiving the process data generated by the data sources over the data pipelines, ingesting feature vectors that represent the process data, processing the ingested feature vectors using machine learning algorithms, and generating a machine learning output that comprises an optimization for the industrial process.

17. The method of claim 15 wherein, surfacing the pipeline suggestion via the software user interface comprises presenting the pipeline suggestion on a display screen.

18. The method of claim 15 wherein, establishing the data pipelines between the data sources associated with the program tags and the machine learning system comprises establishing the data pipelines between the data sources associated with the program tags and the machine learning system in response to adding the program tags to the control program.

19. The method of claim 15 wherein, the data sources comprise industrial assets that carry out the industrial process and the control program comprises a ladder logic diagram.

20. The method of claim 15 wherein, generating the pipeline suggestion that indicates the individual ones of the data pipelines and their corresponding program tags comprises generating the pipeline suggestion that indicates the individual ones of the data pipelines, their corresponding program tags, their corresponding process data types, their associated industrial devices, and whether the individual ones of the data pipelines are active or inactive.

* * * * *